April 30, 1940.   D. B. CLARK   2,199,281
ELECTRICAL CONVERTING SYSTEM
Filed June 29, 1937    2 Sheets-Sheet 1

INVENTOR
Dudley B. Clark
BY John S. Powers
ATTORNEY

April 30, 1940.  D. B. CLARK  2,199,281

ELECTRICAL CONVERTING SYSTEM

Filed June 29, 1937  2 Sheets-Sheet 2

INVENTOR
Dudley B. Clark
BY John S. Powers
ATTORNEY

Patented Apr. 30, 1940

2,199,281

UNITED STATES PATENT OFFICE 2,199,281

ELECTRICAL CONVERTING SYSTEM

Dudley B. Clark, Palm Springs, Calif., assignor to General Electronics Corporation, a corporation of Nevada Application June 29, 1937, Serial No. 150,950

12 Claims. (Cl. 175—363)

This invention relates to improvements in electrical converting systems and proposes a system which, although not necessarily limited to such use, is characterized by features which adapt it particularly to the translation of direct current into polyphase alternating currents.

One object of the invention is to provide a system of the kind generally described in which the translation of the electrical energy into the desired form is accomplished without the aid, either directly or indirectly, of moving parts such as, for example, commutators, brushes and bearings, this object contemplating the use of thermionic valves for this purpose.

A further object is a system which is so designed that loss of energy as an incident to the conversion of the electric current into its desired form is minimized.

A still further object is to provide a converting system in which the frequency of the currents produced may be varied, within limits, in accordance with the requirements of the load circuits.

The invention is illustrated in the accompanying drawings in which.

Figure 1:
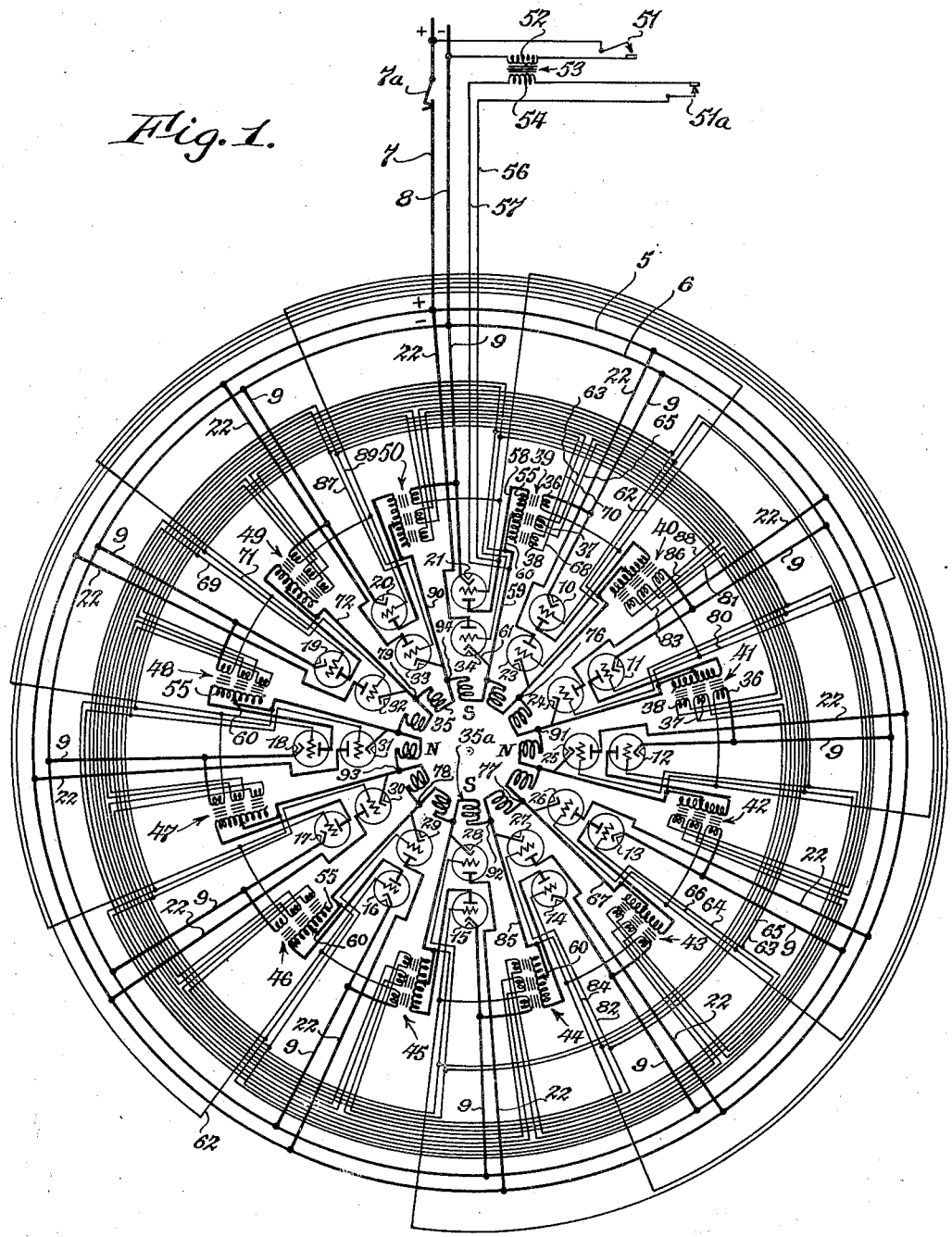
Figure 1 is a diagrammatic illustration of a converter system embodying the invention.

The converter system, as illustrated, includes positive and negative busses 5 and 6, respectively, to which direct current is supplied by the wires 7 and 8 of a feed circuit, there being a switch 7a in the wire 7. The bus 6 is connected by wires 9 to the indirectly heated cathode of each of a series (outer circle) of thermionic tubes 10, 11, 12, 13, 14, 15, 16, 17, 18, 19, 20 and 21 of the triode type while the bus 5 is connected by wires 22 to the anode, or plate, of each of a series of similar tubes (inner circle) 23, 24, 25, 26, 27, 28, 29, 30, 31, 32, 33 and 34. The tubes 10–21 and 23–34 serves as valves. They are operative to connect predetermined numbers of the coils 35 of a winding 35a across the busses 5 and 6 when the proper potential is impressed upon their grids, the biasing circuits for the said grids including the secondaries 36, 37, 38 of transformers 39, 40, 41, 42, 43, 44, 45, 46, 47, 48, 49 and 50.

The system is rendered operative (assuming switch 7a to be closed) by the closing of a switch 51 to connect the primary 52 of a transformer 53 across the feed wires 7 and 8 thereby to produce a current surge in the secondary 54. The exciting impulse thus produced is caused to traverse the primary 55 of the transformer 39. The circuit for the said impulse includes leads 56 and 57, the former being connected to a wire 58 which at one end is connected to the anode of the tube 21 and at its opposite end to one side of the primary of the transformer 39. The lead 57 is connected to a wire 59. One end of the latter is connected by an adjustable contact 60 to the other side of the primary 55, it being understood that the adjustment of the said contact cuts in or out the same number of turns of each of the three sections of the said primary. The opposite end of the wire 59 is connected to the winding 35a, a lead 61 also connecting the said wire to the cathode of the tube 34. When the switch 51 has been closed to produce the exciting impulse in the manner described, a switch 51a in the secondary circuit of the transformer 53 is immediately opened to break the said circuit and prevent a return impulse from being impressed upon the primary of the transformer 39.

Figure 2:
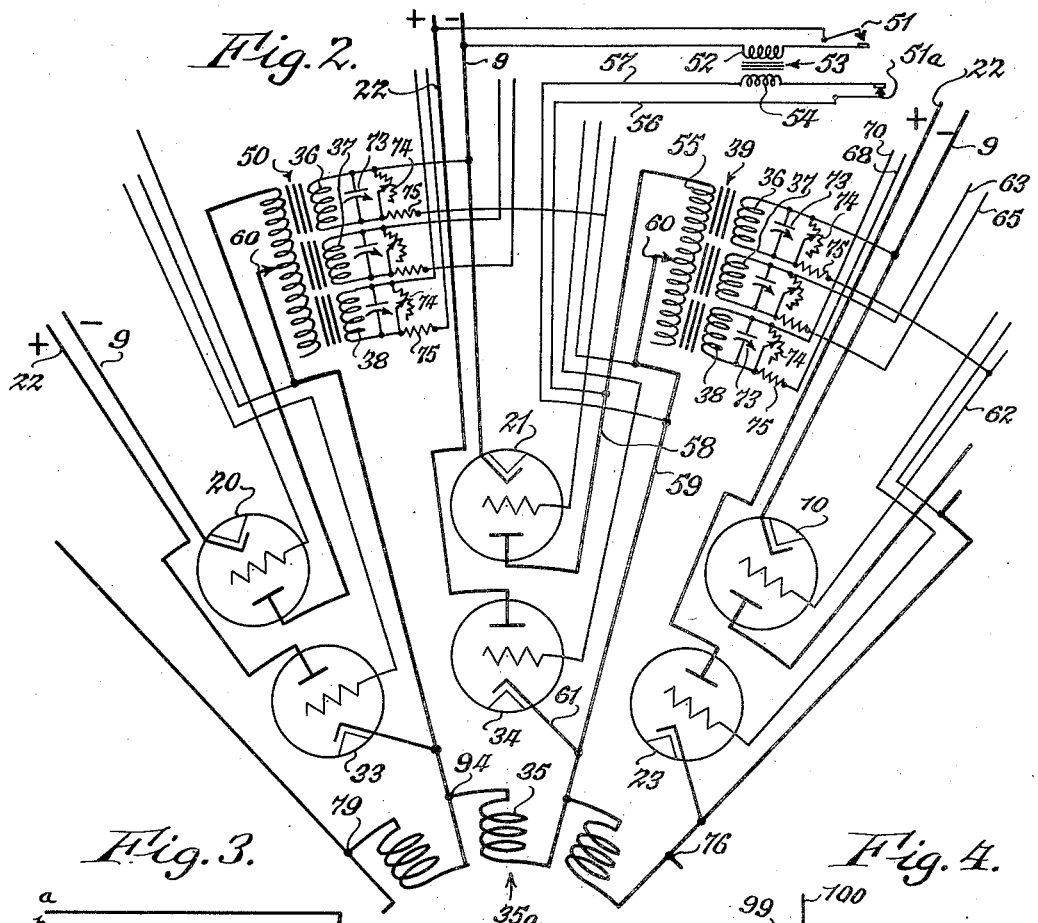
Figure 2 is a portion, to enlarged scale, of Figure 1 and illustrates those parts of the system which, for purposes of clarification, have been omitted in the latter figure.

One side of the secondary 36 of the transformer 39 is connected to the wire 9 which leads to the cathode of the tube 10, the other side of the said secondary being connected to a wire 62 which is connected at one end to the grid of the tube 10 and at the other end to the grid of the tube 16; one side of the secondary 37 is connected by wires 63 and 64 with the grid of tube 26 while the other side of the secondary is connected by wires 65, 66 and 67 with the cathode of the said tube; and one side of the secondary 38 is connected by wires 68 and 69 to the grid of the tube 32 while the other side of the secondary is connected by wires 70, 71 and 72 with the cathode of the said tube. A variable condenser 73 (Figure 2) and a variable resistance 74 are preferably connected across each of the secondaries of transformers 39–50 while a fixed resistance 75 is connected in the grid side of the said secondaries. The surges produced in the secondaries of the transformer 39 by the exciting impulse will, therefore, charge the condensers 73 to a degree determined by their setting, such charges leaking off to the grids of the 10, 26, 16 and 32 at a rate determined by the setting of the resistances 74. As the circuit to the primary of the transformer 39 is interrupted by the opening of the switch 51a of the starter transformer a second impulse is impressed upon each of the secondaries to recharge the condensers 73, this charge likewise leaking off to the grids of the tubes 10, 26, 16 and 32. The condensers and resistances 73 and 74, respectively, thus provide a filter, whereby the two impulses of grid biasing current are smoothed out into a substantially continuous impulse. The said condensers and grids have the further advantage that they provide a means for adjusting the duration of the said impulses.

It will be apparent that when a bias is thus impressed upon the grids of tubes 10, 26, 16 and 32 in the manner described they are rendered conductive and remain so until the potential of said bias falls below a predetermined value. Until this occurs two circuits are completed, one including bus 6, wire 9, tube 10, the primary of transformer 40, adjustable contact 60 to tap 76 on winding 35a, coils 35 of the latter to tap 77, tube 26 and wire 22 to bus 5 and the second circuit including bus 6, wire 9, tube 16, primary of transformer 46, adjustable contact 60 to tap 78 on winding 35a, coils 35 of the latter to tap 79 tube 32 and wire 22 to bus 5. The circuits thus established through the two sections of the winding 35a create a magnetic field having four poles, two north and two south as indicated in Figure 1.

It will be noted that the primary of the transformer 40 is connected in series with those coils of the winding 35a which lie between the taps 76 and 77. Hence the current which traverses the said coils likewise traverses the said primary, thereby producing lagging current surges in the secondaries 36, 37 and 38 of the transformer 40. One side of the secondary 36 of the said transformer is connected to the wire 9 which leads to the cathode of the tube 11, the other side of said secondary being connected to a wire 80 which is connected at one end to the grid of the tube 11 and at the opposite end to the grid of the tube 17; one side of the secondary 37 is connected by wires 81 and 82 with the grid of the tube 27 while the other side of the said secondary is connected by wires 83, 84 and 85 with the cathode of the said tube; and one side of the secondary 38 is connected by wires 86 and 87 with the grid of tube 33 while the other side of the secondary is connected by wires 88, 89 and 90 with the cathode of the said tube.

Thus the lagging surges produced in the secondaries of the transformer 40 are utilized to impress a bias of the proper potential upon the grids of tubes 11, 27, 17 and 33. The said tubes are thereby rendered conductive to complete two circuits, one of which includes bus 6, wire 9, tube 11, primary of transformer 41, adjustable contact 60 to tap 91 on winding 35a, coils 35 of the latter to tap 92, tube 27 and wire 22 to bus 5. The second circuit includes bus 6, wire 9, tube 17, primary of transformer 47, adjustable contact 60 to tap 93 on winding 35a, coils 35 of the latter to tap 94, tube 33 and wire 22 to bus 5. The circuits thus established are maintained until the potential of the biasing impulse is dissipated to such a degree that the tubes are no longer conductive. At such time, of course, the circuits will be interrupted. The circuits while established produce a magnetic field in the winding 35a having four poles, two north and two south. The magnetic field, however, differs from that produced by the circuits controlled by the tubes 10, 26, 16 and 32 in that the north and south poles are advanced a short distance in a clockwise direction with respect to the positions indicated in Figure 1. As the potential of the current in the secondaries of the transformer 40 is building up as that of the current in the secondaries of the transformer 39 is fading, the poles of the magnetic field move at a substantially uniform rate from the position shown in Figure 1 to the new position described.

The primary of the transformer 41 is included in the circuits controlled by the tubes 11, 27, 17 and 33. Hence a current impulse will be impressed upon it as the magnetic field is advanced in the manner described. The secondaries of the said transformer thus render the tubes 13, 29, 19 and 23 conductive to again advance the magnetic field. The magnetic field is further advanced step-by-step in a like manner as the following tube groups are rendered conductive in the order enumerated: 14, 30, 20, 24; 15, 31, 21, 25; 16, 32, 10, 26; 17, 33, 11, 27; 18, 34, 12, 28; 19, 23, 13, 29; 20, 24, 14, 30; and 21, 25, 15 and 3. It will be noted that the last group of tubes above enumerated, namely 21, 25, 15 and 3 complete the cycle. The circuits which they control include the primary of the transformer 39. Hence as the said circuits are completed and a current impulse is impressed upon the said primary the cycle described will be started anew.

From the foregoing it will be apparent that as the magnetic field is caused to advance a step by one set of tubes a second set is conditioned to advance it a further step, a complete cycle producing one revolution of the magnetic field and being repeated so long as the switch 7a remains closed. The system has the advantage that the speed of rotation of the magnetic field may be varied, within limits, to meet varying requirements, it being noted that the application of the biasing impulses to the control electrodes of the tubes may be advanced or retarded by adjustment of the contacts 60 of the transformers 39—50. It is understood, of course, that any number of tubes may be employed. For example, twenty-four sets of tubes may be utilized instead of the twelve sets illustrated, such a system having the advantage that the movement of the magnetic field is rendered more smooth.

Figure 3:
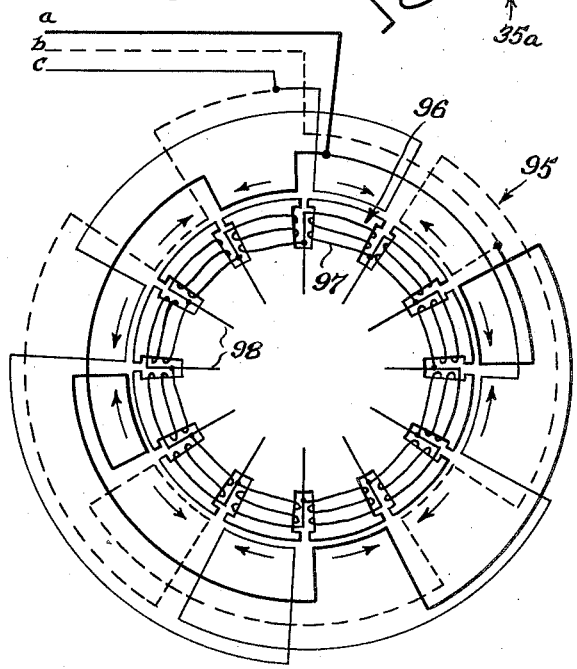
Figure 3 is a diagrammatic view illustrating apparatus which is associated with the converter system to produce three-phase alternating currents.

In the embodiment of the invention illustrated in Figure 3 the system is employed in connection with a three-phase four-pole delta-connected winding 95, the winding in which the moving magnetic field is produced being indicated at 96 and the coils thereof at 97. The leads by which the sections of the winding 96 are connected across the lines of the feed circuit by the tubes are indicated at 98, the alternating currents produced in the winding 95 by the movement of the magnetic field being of a frequency determined by the speed of rotation of the said field and being supplied to the power lines a, b and c.

Figure 4:
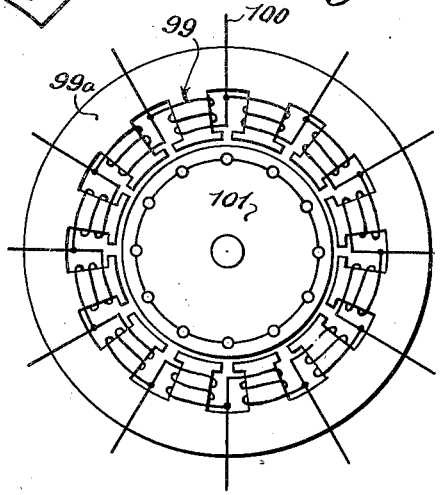
Figure 4 is a diagrammatic view illustrating the manner in which the converter system may be employed to operate a squirrel cage induction motor upon direct current.

In the embodiment illustrated in Figure 4 the rotating magnetic field is produced in the winding 99 of the stator 99a of a conventional squirrel cage induction motor, the leads from the cathodes of the tubes being indicated at 100 and being connected to the winding 99 at regularly spaced intervals. The motor is thus operated upon direct current and the speed of the rotor 101 may be adjusted by controlling the speed of the rotation of the magnetic field produced in the winding 99.

It will be apparent that if alternating current is supplied to the feed lines 7 and 8, assuming a battery is employed to produce the initial exciting impulse which is impressed upon the primary of the transformer 39, the said current will be rectified by the tubes. In such case the rotation of the magnetic field will be produced by the positive portions of the current cycles.

I claim as my invention:

1. An electrical converting system including a direct current feed circuit, a winding, valves which connect different sections of said winding across the lines of said feed circuit, said valves having control electrodes, transformers having secondaries for impressing biasing impulses upon said electrodes, the primaries of said transformers being connected in the circuits of said winding sections in such a manner that as one of said sections is connected to said feed circuit a current impulse is impressed upon the primary of a transformer having a secondary connected to the control electrode of a valve which is included in the circuit of another of said winding sections, whereby to produce a magnetic field in said winding which traverses a prescribed path in continuous cycles and means for impressing an exciting impulse upon the primary of one of said transformers.

2. An electrical converting system including a direct current feed circuit, a winding, valves which connect different sections of said winding across the lines of said feed circuit, said valves having control electrodes, transformers having secondaries for impressing biasing impules upon said electrodes, the primaries of said transformers being connected in the circuits of said winding sections in such a manner that as one of said sections is connected to said feed circuit a current impulse is impressed upon the primary of a transformer having a secondary connected to the control electrode of a valve which is included in the circuit of another of said winding sections, whereby to produce a magnetic field in said winding which traverses a prescribed path in continuous cycles and means for varying the frequency of said magnetic field.

3. An electrical converting system including a direct current feed circuit, a winding, valves which connect different sections of said winding across the lines of said feed circuit, said valves having control electrodes, transformers having secondaries for impressing biasing impulses upon said electrodes, the primaries of said transformers being connected in the circuits of said winding sections in such a manner that as one of said sections is connected to said feed circuit a current impulse is impressed upon the primary of a transformer having a secondary connected to the control electrode of a valve which is included in the circuit of another of said winding sections, whereby to produce a magnetic field in said winding which traverses a prescribed path in continuous cycles and means for adjusting the primaries of said transformers to vary the frequency of said magnetic field.

4. An electrical converting system including a direct current feed circuit, a winding, valves which connect different sections of said winding to said feed circuit, said valves having control electrodes, transformers having secondaries for impressing biasing impulses upon said electrodes and condensers across said secondaries for repeating the impulses impressed upon the latter, the primaries of said transformers being connected in the circuits of said winding sections in such a manner that as one of said sections is connected to said feed circuit a current impulse is impressed upon the primary of a transformer having a secondary connected to the control electrode of a valve which is included in the circuit of another of said winding sections, whereby to produce a magnetic field in said winding which traverses a prescribed path in continuous cycles.

5. An electrical converting system including a direct current feed circuit, a winding, valves which connect different sections of said winding to said feed circuit, said valves having control electrodes, transformers having secondaries for impressing biasing impulses upon said electrodes, condensers across said secondaries for repeating the impulses impressed upon the latter and resistances for controlling the rate at which said current impulses are permitted to leak to said control electrodes, the primaries of said transformers being connected in the circuits of said winding sections in such a manner that as one of said sections is connected to said feed circuit a current impulse is impressed upon the primary of a transformer having a secondary connected to the control electrode of a valve which is included in the circuit of another of said winding sections, whereby to produce a magnetic field in said winding which traverses a prescribed path in continous cycles.

6. An electrical converting system including a direct current feed circuit, a winding, valves which connect different sections of said winding to said feed circuit, said valves having control electrodes, transformers having secondaries for impressing biasing impulses upon said electrodes, condensers across said secondaries which are charged by said biasing impulses, the primaries of said transformers being connected in the circuits of said winding sections in such a manner that as one of said sections is connected to said feed circuit a current impulse is impressed upon the primary of a transformer having a secondary connected to the control electrode of a valve which is included in the circuit of another of said winding sections, whereby to produce a magnetic field in said winding which traverses a prescribed path in continuous cycles and means for adjusting the primaries of said transformers to vary the frequency of said magnetic field.

7. An electrical converting system including direct current supply lines, a plurality of circuits, valves which connect said circuits across said supply lines, said valves having control electrodes, transformers having secondaries for impressing biasing impulses upon said electrodes, the primaries of said transformers being connected in said circuits in such a manner that as one of said circuits is connected to said supply lines a current impulse is impressed upon the primary of a transformer having a secondary connected to the control electrode of a valve which is included in another of said circuits, whereby to connect said circuits to said supply lines in a predetermined sequence and means for impressing an exciting impulse upon the primary of one of said transformers.

8. An electrical converting system including current supply lines, a plurality of circuits, valves which connect said circuits to said supply lines, each of said valves having a control electrode and transformers for rendering said valves conductive, whereby to connect said circuits to said supply lines in a predetermined sequence, each of said transformers having a primary which is included in one of said circuits and a plurality of secondaries for impressing biasing impulses upon a plurality of said control electrodes.

9. An electrical converting system including a feed circuit, a plurality of winding sections, a plurality of pairs of triodes, each of said pairs of triodes connecting a different winding section across the lines of said feed circuit, one side of each of said sections being connected to the cathode of one of said pairs of triodes and the other side being connected to the anode of the other of said pairs and means for impressing biasing impulses upon the control electrodes of said pairs of triodes in a predetermined sequence, whereby to produce a magnetic field which traverses said winding sections in a prescribed path in continuous cycles.

10. An electrical converting system including a feed circuit, a plurality of winding sections, a plurality of pairs of triodes, each of said pairs of triodes connecting a different winding section across the lines of said feed circuit, one side of each of said sections being connected to the cathode of one of said pairs of triodes and the other side being connected to the anode of the other of the said pairs and transformers for impressing biasing impulses upon the control electrodes of said pairs of triodes in a predetermined sequence, whereby to produce a magnetic field which traverses said winding sections in a prescribed path in continuous cycles, the primaries of said transformers being included in the circuits of said winding sections.

11. An electrical converting system including a direct current feed circuit, a plurality of windings, valves for individually connecting said windings across the lines of said feed circuit, said valves having control electrodes, transformers for impressing biasing impulses upon said electrodes in a predetermined sequence, whereby to produce a magnetic field which traverses said windings in a prescribed order and means for varying the frequency of said magnetic field.

12. An electrical converting system including a feed circuit, a plurality of winding sections, a plurality of pairs of triodes, each of said pairs of triodes connecting a different winding section across the lines of said feed circuit, one side of each of said sections being connected to the cathode of one of said pairs of triodes and the other side being connected to the anode of the other of said pairs, means for impressing biasing impulses upon the control electrodes of said pairs of triodes in a predetermined sequence, whereby to produce a magnetic field which traverses said winding sections in a prescribed path in continuous cycles and means for varying the frequency of said magnetic field.

DUDLEY B. CLARK.